United States Patent [19]
Tanaka

[11] Patent Number: 5,297,266
[45] Date of Patent: Mar. 22, 1994

[54] APPARATUS AND METHOD FOR CONTROLLING MEMORY REQUESTS IN AN INFORMATION PROCESSOR

[75] Inventor: Katsumi Tanaka, Tokyo, Japan
[73] Assignee: Nec Corporation, Tokyo, Japan
[21] Appl. No.: 997,125
[22] Filed: Dec. 24, 1992

Related U.S. Application Data

[63] Continuation of Ser. No. 468,940, Jan. 23, 1990, abandoned.

[30] Foreign Application Priority Data

Jan. 25, 1989 [JP]  Japan ................................. 1-15392

[51] Int. Cl.$^5$ ............................................. G06F 12/02
[52] U.S. Cl. ............................. 395/400; 364/DIG. 1;
364/258.1; 364/259.1; 364/259.2
[58] Field of Search ... 364/200 MS File, 900 MS File;
395/400, 425

[56] References Cited

U.S. PATENT DOCUMENTS

| | | | |
|---|---|---|---|
| 4,652,991 | 3/1987 | Yamano ............................. | 364/200 |
| 4,662,991 | 3/1987 | Yamano ............................. | 395/425 |
| 4,670,836 | 6/1987 | Kubo et al. ........................ | 364/200 |
| 4,739,470 | 4/1988 | Wada et al. ....................... | 395/375 |
| 4,858,105 | 8/1989 | Kuriyama et al. ................. | 395/375 |
| 4,914,617 | 4/1990 | Putrino et al. ..................... | 364/786 |
| 4,920,482 | 4/1990 | Hasebe et al. ...................... | 364/200 |

FOREIGN PATENT DOCUMENTS

0270125A2  6/1988  European Pat. Off. .
2434429  3/1980  France .

OTHER PUBLICATIONS

"Destructive Overlap Detection Hardware" Ngai et al., IBM Technical Disclosure Bulletin, vol. 19, No. 1, Jun. 1976, pp. 61–64.
IBM System/370 Principles of Operation, pp. 5-4, 5-7 and 7-24, Oct. 1981.

*Primary Examiner*—Joseph L. Dixon
*Assistant Examiner*—Hiep T. Nguyen
*Attorney, Agent, or Firm*—Foley & Lardner

[57] ABSTRACT

An apparatus and method for controlling memory requests in an information processor is capable of generating an effective address for a first operand and a second operand, both of which are part of an instruction used to transfer data from a first memory location to a second memory location. The first operand indicates the first memory location and the second operand indicates the second memory location. By changing, in response to address overlap of the first and second operands, control of requests for memory accessing by changing the read address of a control memory, useless memory accessing is avoided resulting in faster processing.

12 Claims, 4 Drawing Sheets

APPARATUS AND METHOD FOR CONTROLLING MEMORY REQUESTS IN AN INFORMATION PROCESSOR

This application is a continuation of application Ser. No. 07/468,940, filed Jan. 23, 1990, now abandoned.

BACKGROUND OF THE INVENTION

The present invention relates to an information processing apparatus for controlling memory requests during operation of an information processor.

Control of memory requests in the operation of an information processing apparatus may be accomplished, using a system of MOVE instructions by which data on a memory indicated by a first operand, are transferred byte by byte to a storage location on another memory, indicated by a second operand. In the execution of these MOVE instructions, the actual transfer of data takes place a plurality of bytes at a time, in order to improve the performance of the information processing apparatus.

In such a system, the presence or absence of destructive overlap between the two operands is detected according to the difference between the leading address of the first operand and that of the second operand. In response to the detection of operand overlap, a read address for the control memory is generated corresponding to the extent of the overlap lag, and an address, which references the control memory in order to determine which step to be executed next, is altered to demand memory access accordingly.

As an example of such a system by the prior art, reference may be made to the U.S. Pat. No. 4,652,991, which discloses a system having a calculating unit for calculating the difference between addresses from the transfer originating side address storing unit and addresses from the transfer receiving side address storing to calculate the duplication lag between the effective address of the transfer originating side data and that of the transfer receiving side data and thereby calculating the difference between the transfer originating side data and the transfer receiving side data. In this calculating operation, the address difference is calculated by the calculating unit after the addresses are stored into the address storing unit. For this reason, an information processing apparatus capable of generating the address of operand data by address qualification, such as base qualification or index qualification, can calculate the difference between the transfer originating side data and the transfer receiving side data only after subjecting both data to address qualification and generating effective addresses.

SUMMARY OF THE INVENTION

An object of the present invention is to provide an information processing apparatus free from the foregoing disadvantage and capable of increasing the processing speed by detecting the difference between the transfer originating side data and the transfer receiving side data before generating effective addresses.

An apparatus according to one aspect of the invention is a pipeline-controlled information processing apparatus for generating an effective address for a first operand and a second operand, and changing the control of requests for memory accessing by changing the read address of a control memory in response to the presence or absence of overlap between the two operands, comprising an identity detecting unit for detecting the presence or absence of identity in register number for use in address generation at the time of generating the effective addresses for the first and second operands;

a difference detecting unit for detecting any difference in displacement between the first and second operands; and changing unit for changing the read address of the control memory in accordance with the result of detection by the difference detecting unit if identity is detected by the identity detecting unit.

BRIEF DESCRIPTION OF THE DRAWINGS

Other features and advantages of the present invention will become more apparent from the following detailed description when taken in conjuction with the accompanying drawings, in which.

In the drawings, the same reference numerals denote respectively the same constituent elements.

DESCRIPTION OF THE PREFERRED EMBODIMENT

With reference to a preferred embodiment of the present invention, the execution of a MOVE instruction will be described as an example, according to which data on a memory indicated by a first operand are transferred byte by byte to a storage position on another memory indicated by a second operand. For the sake of comprehension, the MOVE instruction to be executed in this embodiment is supposed to have an operand length of 36 bytes and a lag of one byte between the leading address a1 of the first operand and the leading address a2 of the second operand. Also, the memories of the information processing apparatus used here are supposed to be accessed in units of eight bytes each.

Figure 4:
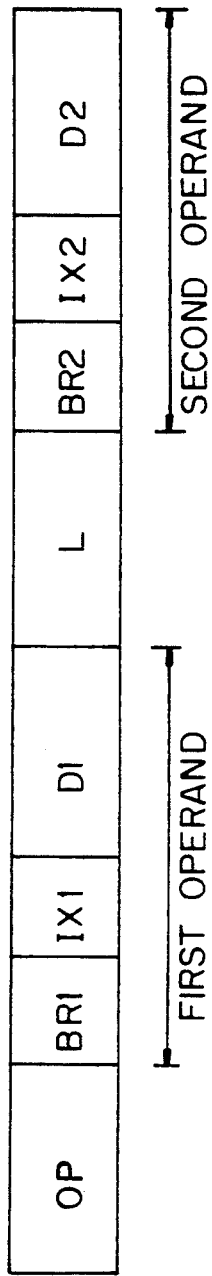
FIG. 4 shows the form of the MOVE instruction for use in describing the preferred embodiment.

Referring to FIG. 4, the MOVE instruction applied to the preferred embodiment of the invention consists of an operand code field OP, base register number fields BR1 and BR2, index register number fields Ix1 and Ix2, displacement fields D1 and D2, and an operand length field L. The combined fields BR1, Ix1 and D1 are treated as a first operand or operand 1, and the combined fields BR2, Ix2 and D2, as a second operand or operand 2.

Figure 1:
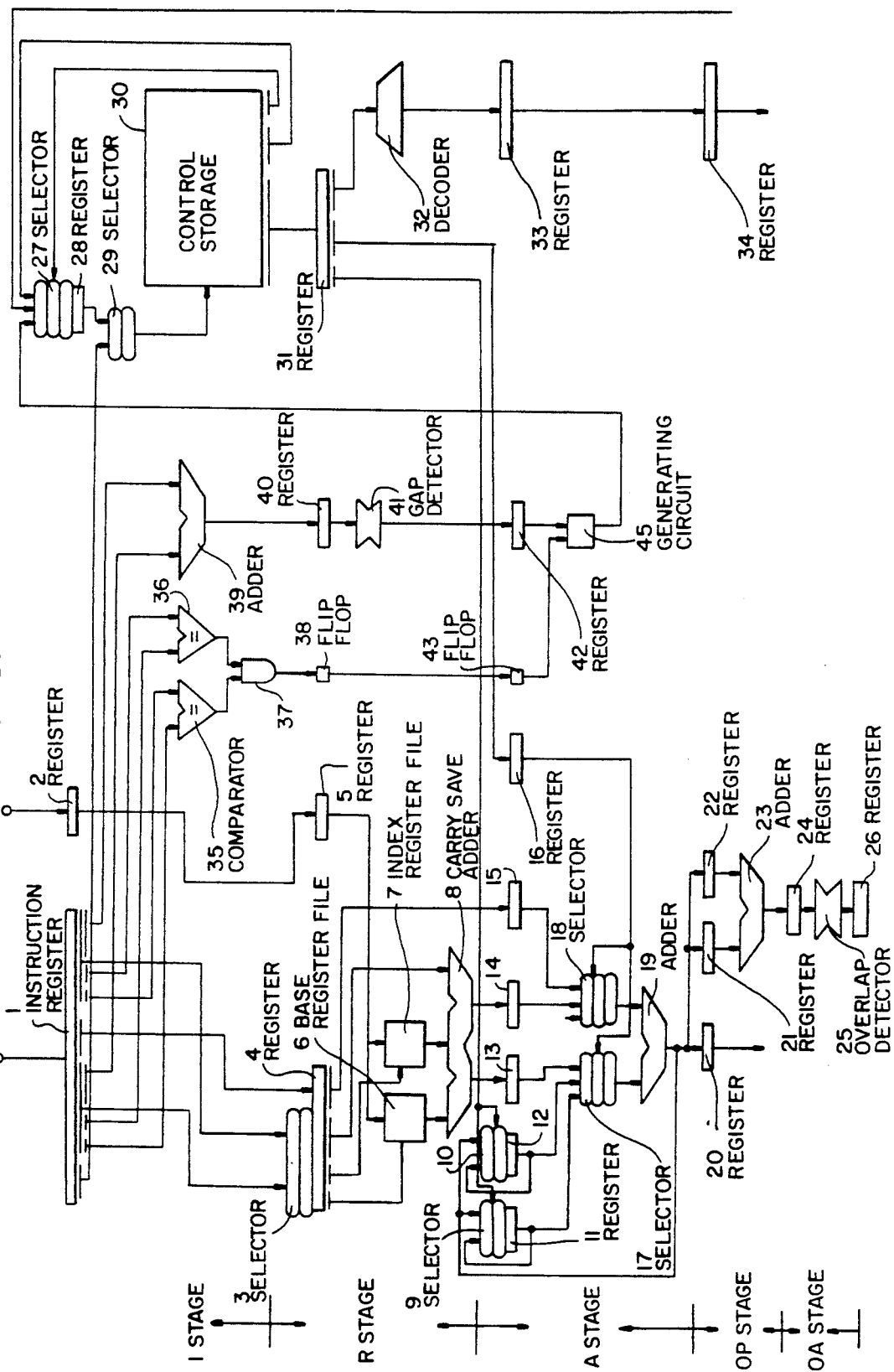
FIG. 1 illustrates a preferred embodiment of the invention.

The embodiment of the invention shown in FIG. 1 operates under a pipeline control system comprising a plurality of systems. Of these stages, an instruction register (I) stage, a register address (R) stage and an address generating (A) stage operate with synchronism between a control line and a data line. The A stage is followed by an overlap detecting (OD) stage and an overlap address generating (OA) stage, both operating with the control line alone.

The I stage includes registers 4, 5, 40 and 31, an F/F 38 and elements superior to it. The R stage includes these registers 4, 5, 40 and 31, elements ranging from the F/F 38 and registers 11 to 16, 42 and 33 to an F/F 43. The A stage includes registers 11 to 16, 42 and 33 and elements from the F/F 43 to an ALU 19. The OD stage includes registers 20 to 22 and an ALU 23. The OA stage includes a register 24 and a logical operation circuit 25.

Referring now to FIG. 1, the preferred embodiment of the present invention comprises an instruction register 1 for storing instructions including a MOVE instruction; a selector 3 for selecting either the first or the second operand of any instruction stored in the instruction register 1; a register 4 for storing the result of selection by the selector 3 and the content of the operand length field L; registers 2 and 5 for storing base addresses and index addresses provided from outside; a base register file 6 for storing and reading out a base address in a position indicated by the base register number BR1 from the register 4; a Index register file 7 for storing and reading out an index address in a position indicated by the index register number Ix1 from the register 4; a three-input carry save adder (CSA) 8 for adding the base address from the base register file 6, the index address from the index register file 7 and a displacement from the displacement field D1 of the register 1, and supplying a local sum and a carry; a register 13 for storing the local sum from the three-input CSA 8; a register 14 for storing the carry from the three-input CSA 8; a register 15 for storing the operand length from the register 4; a selector 29 for selecting an OP code from the register 1; a control memory 30 for outputting a microinstruction from a memory location indicated by the content selected by the selector 29; a microinstruction register 31 for storing the microinstruction output by the control memory 30; a register 16 for storing part of the output of the register 31; a selector 17 capable of selecting the local sum from the register 13 as instructed by the register 16; a selector 18 capable of selecting the carry from the register 14 as instructed by the register 16; an arithmetic logic unit (ALU) 19 for generating an effective address based on the local sum and the carry from these selectors 17 and 18, respectively; selectors 9 and 10 for selecting the effective address generated by the ALU 19 either this timing cycle or the previous timing cycle as instructed by part of the output of the register 31; registers 11 and 12 for storing the outputs of the selectors 9 and 10; registers 20, 21 and 22 for storing addresses generated by the ALU 19; an ALU 23 for calculating and supplying the difference between the effective address of the first operand determined last time and that of the second operand determined this timing cycle on the basis of the addresses from the registers 21 and 22; a logical operation circuit 25 for detecting any overlap between the first and second operands on the basis of the difference stored in the register 24 and for detecting the possibility thereafter of consecutively storing second operands without reading the first operand data; a register 26 for storing the output of the local operation circuit 25; an arithmetic logic unit or ALU 39 for detecting a difference which is the lag between the displacement of the first operand and that of the second operand in the register 1; a register 40 for storing the difference; a changing address generating circuit 41 for generating a changing address from the lag between the first and second operands stored in the register 40 the changing address is used in reading out control information, responding to said lag; an address register 42 for storing the changing address generated by the changing address generating circuit 41; a comparator 35 for comparing the base register numbers of the first and second operands stored in the register 1; a comparator 36 for comparing the index register numbers of the first and second operands stored in the register 1; an AND gate 37 for obtaining the logical product of the outputs of the comparators 35 and 36 and detecting the presence or absence of overlap between the operands; flipflops (F/F's) 38 and 43 for storing the output of the AND gate 37; a control memory address-for-overlap generating circuit 45 for supplying the changing address at the time of operand overlap according to the outputs of the F/F 43 and the address register 42; a selector 27 for selecting one each of the outputs of the generating circuit 45, the register 26 and the control memory 30 in accordance with another output of the control memory 30; and a register 28 for storing the results of selection by the selector 27.

Next the operation of the preferred embodiment of the invention will be described in detail with reference to drawings. The following discussion deals with an example, where the execution of a MOVE instruction transfers, byte by byte, data in a memory indicated by the first operand to a storage position in another memory indicated by the second operand. In order to facilitate the discussion, the MOVE instruction to be executed by this embodiment has an operand length of 32 bytes and a lag of one byte between the leading address a1 of the first operand and the leading address a2 of the second operand. Further, the unit of accessing memories in this embodiment, which is an information processing apparatus, uses eight bytes.

Now will be explained ideal requests for memory accessing when the operands are overlapped with a lag or difference of one byte, when the MOVE instruction is to be executed. First a read-and-read check request (a1R) occurs, which concurrently is a check request for checking whether or not reading the leading datum indicated by the first operand and the datum itself are ready. Next a write check request (a2WC) occurs, which checks whether or not the leading part of the data storage location indicated by the operand 2 is ready on the main storage. Then a read check request (a1+1RC) occurs, which checks whether or not a trailing part of the first operand is ready in the main storage. Next the write check request (a2+1WC) occurs, which checks whether or not a trailing part of the data storage location is ready in the main storage. Then, write requests (a2W, a2+8W, a2+16W and a2+24W) occur, where a2W is the write address to the effective address a21, a2+8W is the write request to the effective address a2+8, etc., which store the first operand data into the whole 32-byte storage location since the operand lag is one byte.

In a normal case where no overlap is present, after a request for a2+1WC, requests to the memory usually occur in a sequence of a1+8R, a2W, a1+16R, a2+8W, a1+24R, a2+16W and a2+24W, where a1+8R is the read request to the effective address a1+8, a1+16R is the read request to the effective address a1+16, etc. An actual operation will now be described on the basis of the foregoing assumptions.

Figure 3:
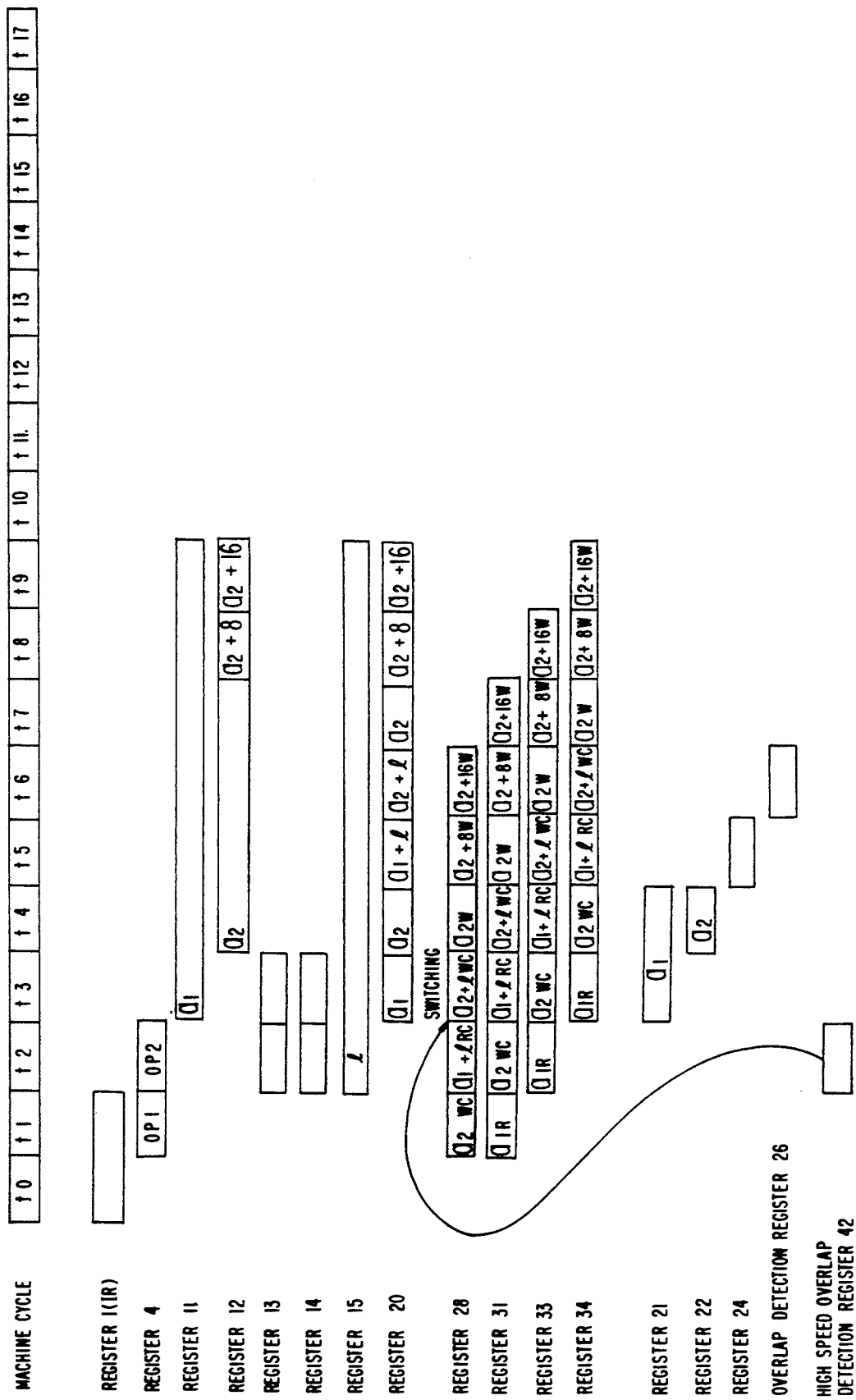
FIG. 3 is a diagram illustrating the operation of the preferred embodiment of the invention.

Referring now to FIGS. 1 and 3, first the instruction word of the MOVE instruction is stored into the register 1, which holds the instruction word, then first operand or OP1 and the operand length are stored in the register 4. At this time, the control memory 30 is actuated with the OP code in the OP code field of the register 1 as the actuating address, and control information is read out.

A branch command from a control information read out, which controls the branching of the control memory, causes a next address (NA) field, indicating the read address of the next step in a normal case, to be stored into the register 28, and at the same time, the comparator 35 compares the base register numbers of the first and second operands in the register 1 and the comparator 36 compares the index register numbers of the first and second operands. The results of comparison are processed by the AND gate 37, outputting of valve indicating whether or not an operand overlap has occured and storing this valve in the register 38.

At the same time, the difference or lag between the displacement fields of the first and second operands is figured out by a two-input adder 39. In this embodiment, it is assumed that the base register number fields are identical to each other, and the index register number fields are identical to each other. The difference between the displacement fields is one byte.

Next, as indicated by the base register number and the index register number of the first operand entered into the register 4, address generating information is read out of the base register file 6 and the index register file 7 and, together with the displacement, is entered into the three-input CSA 8, which generates the local sum and the carry and stores them in the registers 13 and 14.

Responding to the lag between the first and second operands stored in the register 40, the circuit 41 generates a changing address for reading out control information. This address is stored in the register 42. A microinstruction for generating the leading address a1 of the first operand, read out from the register 31, is input to, and decoded by, a decoder 32, which generates the codes for access requests to memories.

At the I stage, simultaneously with the accomplishment of the foregoing processing at the R stage, the second operand OP2 is stored into the register 4, and the next microinstruction is read out of the control memory 30 by the NA field stored in the register 28, and stored in the register 31. In this manner, address generating information for a1r, a2wc (write check request to the effective address a2) and a1+1RC is successively read out of the control memory 30, and effective addresses are generated to demand accesses to memories.

Concurrent with the reading of control information for a1+1, the address of the step having the storage address for the control information a1+8R of a2+1WC is sent to the register 28 upon a usual access request. Here, a read changing address for the control memory, generated by the circuit 41 when the MOVE instruction involves an overlap, is sent from the register 42 to the register 28.

At this point, in this preferred embodiment, the overlap of operands is detected from the results of the comparators 35 and 36 and the ALU 39. Therefore, the selector 27 selects the output of the register 42 and stores it in the register 28. Further the control information indicated by the output of register 42 has an NA address indicating the field in which to store the control information for a2+1WC and that for a1W.

Thus, in this embodiment of the invention, the read address for the control memory 30 can be switched away from the usual routine by detecting an identity between the base register number of the first operand OP1 and the second operand OP2, as well as by detecting an identity between the index register numbers of the first operand, OP1 and the second operand, OP2, and finally by detecting the difference between the displacement fields of OP1 and OP2. This switching makes it possible to successively issue ideal access requests to memories when there is an overlap between operands.

Next will be described in detail a specific example of the address generating circuit 41, which is one of the characteristic features of the present invention.

Figure 2:
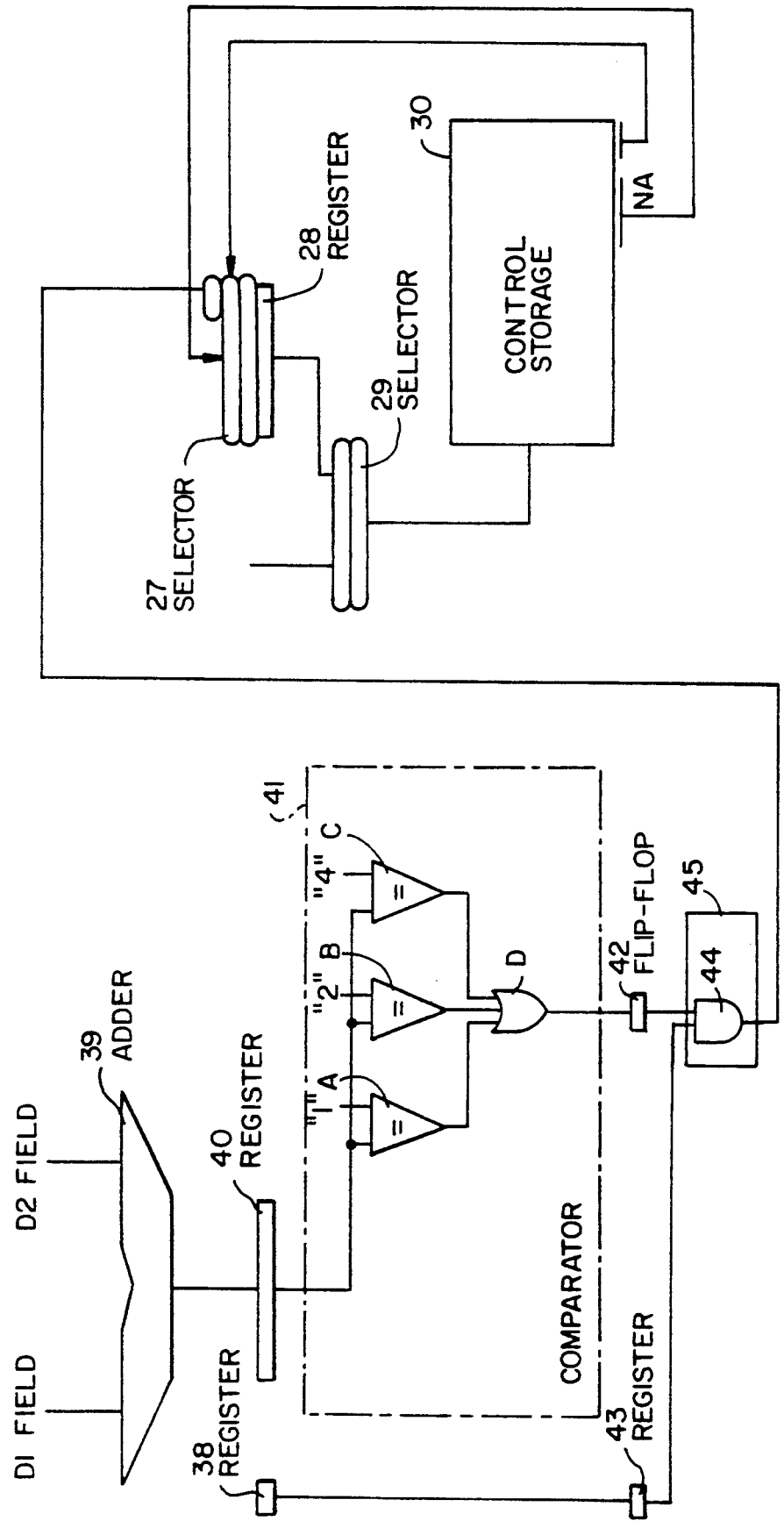
FIG. 2 illustrates one example of the address generating circuit 41 shown in FIG. 1 and circuits around it.

Referring to FIG. 2, it is assumed in the following description that switching to high-speed processing shown in FIG. 3 takes place when the overlap lag between the D1 and D2 fields, which are generation requests for the leading addresses a1 and a2 of the first and second operands, respectively, is one byte, two byte or four byte.

It is assumed that the ALU 39 subtracts the D2 field from the D1 field, and the difference is stored in the register 40. Then the value of the register 40 is checked by the comparators A, B and C for identity with 1, 2 and 4. If the output of any one of the comparators turns out to be "1" at an OR gate D, the OR gate D will output "1".

Further, an identity is detected by the comparators 35 and 36 shown in FIG. 1, and the register 38 is set to "1", indicating identity. Further, the control memory address for overlap is generated by the output of the register having received value at a timing of -T cycles and the control memory address generating circuit 45 for generating the control memory address for overlap, and is sent out to the least significant section of the selector 27. In this embodiment of the invention, the control memory address generating circuit 45 consists of an AND gate 44. The selector 27 reads out the microinstruction for the next step in response to the NA indicated by the control memory 30. In the control memory, there is a field which makes the output of the AND gate 44 effective, and the output of the AND gate 44 is selected here when said field is "1".

If, for instance, the NA is XXXX0 and the duplication lag between the D1 and D2 fields is not 1, 2 or 4, the address of the control memory 30 will be XXXX0, whereas if the lag is 1, 2 or 4, the address of the control memory will be XXXX1. Now, a microprogram in the control memory 30 can be so set in advance that the NA values shown in FIG. 3 can be successively stored in the sections following the address section XXXX1 indicating the storage position of the control memory 30.

Incidentally, the register 43 and and gate 44 are intended for matching the timing.

The present invention takes note of the high degree of correlation between operand overlap and the identity between the register numbers of operands used at the time of effective address generation.

One of the characteristic features of the invention is the detection of the presence or absence of identity between the register numbers which are used in generating the effective addresses of the first and second operands, when executing an operation such as a MOVE instruction which alters access demands to memories according to the presence or absence of duplication between two operands, as well as the detection of the difference between the displacement fields of the first and second operands. According to detection of identity between the register numbers and detection of the difference between the displacement fields, the presence or absence of operand overlap and overlap lag, can be detected at high speed. Therefore, useless memory accessing requests which occur in specific cases of operand overlap are dispensed with, resulting in the advantage of faster processing.

Another feature of the invention lies in checking, before the generation of effective addresses, for an identity between the register numbers of address qualifying registers, which are effective address generating elements for the transfer originating side data and transfer receiving side data. Thus, by treating this register number identity as the detection of a difference between the transfer originating side data and transfer receiving side data, the address for referencing the control memory to reference the step to be executed next is changed before the generation of effective addresses, and memory accesses are requested on that basis, resulting in the achievement of faster information processing.

What is claimed is:

1. A pipeline-controlled information processing apparatus for generating an effective address for a first operand indicating a first memory location and a second operand indicating a second memory location, and changing control of requests for memory accessing based on an overlap between said first and second operands, comprising:

identity detecting means for detecting and providing an indication of whether or not a first register number corresponding to a first memory address for said first operand is identical to a second register number corresponding to a second memory address for said operand;

difference detecting means coupled to said identity detecting means for detecting a difference in displacement between said first and second operands; and changing means coupled to said difference detecting means for changing a read address of a control memory in accordance with the result of detection by said difference detecting means whenever said indication provided by said identity detecting means is that said first and second register numbers are identical.

2. An apparatus for controlling data transfer from a first memory location indicated by a first memory address to a second memory location indicated by a second memory address comprising:

control memory means for storing control information corresponding to said data transfer;

identity indicating means coupled to said control memory means for providing an indication of whether or not a first register number is identical to a second register number, said first register number corresponding to said first memory address, said second register number corresponding to said second memory address;

difference detecting means coupled to said identity indicating means for detecting a difference in displacement between said first and second memory addresses; and read address determining means coupled to said difference detecting means for determining a read address in accordance with said difference whenever said identity indicating means provides said indication that said first register number is identical to said second register number, wherein said read address indicates a location of said control information in said control memory means.

3. An apparatus as claimed in claim 1, wherein said difference detecting means includes an arithmetic logic unit and wherein said difference equals to a lag between the displacement of the first and second operands stored in an instruction register, and wherein said first and second operands include first and second base register numbers and first and second index register numbers, respectively, and further comprises:

a first register coupled to said arithmetic logic unit for storing the difference;

a changing address generating circuit coupled to said first register for generating a changing address for reading control information, in response to the lag between the first and second operands stored in the first register;

an address register coupled to said changing address generating circuit for storing the address generated by the changing address generating circuit;

a first comparator coupled to said instruction register for comparing the first and second base register numbers of the first and second operands stored in the instruction register;

a second comparator coupled to said instruction register for comparing the first and second index register numbers of the first and second operands stored in the instruction register;

an AND gate coupled to said first and second comparators for obtaining a logical product of the outputs of the first and second comparators and detecting a presence or absence of an operand overlap between the first and second operands;

a plurality of flip-flops coupled to said AND gate for storing the output of the AND gate and an overlap generating circuit coupled to said flip-flops for supplying a change in address at the time of the operand overlap.

4. An apparatus as claimed in claim 2 wherein said first and second register numbers comprise a first and second base register number, respectively, wherein said first and second base register numbers detect an overlap condition between said first and second memory locations.

5. An apparatus as claimed in claim 2 wherein said difference detecting means comprises an arithmetic logic unit.

6. An apparatus as claimed in claim 2 wherein said first and second register numbers comprise a first and second index register number, respectively, wherein said first and second index register numbers detect an overlap condition between said first and second memory locations.

7. An apparatus as claimed in claim 6 wherein said identity indicating means comprises:

a comparator for comparing said first and second index register numbers.

8. A method for controlling data transfer from a first memory location indicated by a first memory address to a second memory location indicated by a second memory address comprising the steps of:

storing control information corresponding to said data transfer in a control memory unit;

indicating whether or not a first register number is identical to a second register number, said first register number corresponding to said first memory address, said second register number corresponding to said second memory address;

detecting a difference in displacement between said first and second memory addresses; and determining a read address in accordance with said difference whenever said indicating step indicates that said first register number is identical to said second register number, wherein said read address indicates a location of said control information in said control memory unit.

9. An apparatus as claimed in claim 8 wherein said first and second register numbers comprise a first and second base register number, respectively, and wherein said step of detecting a difference includes detecting a difference between said first and second base register numbers.

10. A method as claimed in claim 8 wherein said step of detecting said difference is performed by an arithmetic logic unit.

11. An apparatus as claimed in claim 8 wherein said first and second register numbers comprise a first and second index register number, respectively, and wherein said step of detecting a difference includes detecting a difference between said first and second index register numbers.

12. A method as claimed in claim 11 wherein said step of indicating an identity includes the steps of:
    comparing said first and second index register numbers.

* * * * *